INVENTORS
NORMAN A. WRIGGLESWORTH
FRANCIS R. MOORE
ATTORNEYS

May 14, 1963     N. A. WRIGGLESWORTH ETAL     3,089,942
AIR-TEMPERING DEVICES

Filed July 7, 1960                              2 Sheets-Sheet 2

INVENTORS
NORMAN A. WRIGGLESWORTH
FRANCIS R. MOORE
BY
ATTORNEYS

United States Patent Office 3,089,942
Patented May 14, 1963

3,089,942
AIR-TEMPERING DEVICES
Norman A. Wrigglesworth, Williamsville, and Francis R. Moore, Eggertsville, N.Y., assignors to American Optical Company, Southbridge, Mass., a voluntary association of Massachusetts
Filed July 1, 1960, Ser. No. 40,435
3 Claims. (Cl. 219—39)

The field of this invention is that of air-tempering devices, and the invention relates more particularly to a novel and improved device for temporarily heating an article by means of heated air.

In providing thermoplastic ophthalmic frames or mountings with lenses and in conforming the frames to desired contours, the frames are heat-softened by various means for permitting slight adjustments of portions of the frames to fit the facial requirements of different individuals and to permit the removal or placement of lenses therein. Heating of the frames for these purposes must be accurately controlled to avoid fracture of the frames or the establishment of internal stress areas in the frames such as might occur if the frames were deformed while insufficiently or unevenly heated. Heating must also be controlled to avoid scorching or blistering of the frames such as might occur if the frames were overheated. Apparatus previously used for heat-softening ophthalmic frames, in most instances, comprised aggregations of heated beads in which frames would be temporarily buried, or means embodying electrically heated cones or the like have been used, all of which provided inadequately controlled frame heating so that frame spoilage during the shaping of frames of the installation of lenses frequently occurred. Further, the operator of such apparatus had to supervise the frame-heating process for removing the frame from the heating apparatus at the proper time before overheating of the frame occurred.

It is an object of this invention to provide an improved air-tempering device for temporarily heating an article to a desired controlled temperature; to provide such a device for heating such an article quickly and conveniently; to provide such a device upon which an article can be supported during heating thereof; to provide such a device upon which an article being heated can remain for an unlimited period of time without risk of overheating the article so that no operator supervision of article heating time is required; to provide such a device for heating all parts of the article to a uniform degree; to provide such a device which can be adapted to permit heating of less than an entire article; and to provide such a device having convenient means for rapidly cooling the article to ambient temperature thereafter.

It is a further object of this invention to provide a compact and inexpensive apparatus for heat-softening ophthalmic frames or mountings to permit modification of the shapes of certain parts thereof; to provide such an apparatus which can be conveniently and safely operated without risk of burning or other injury to the operator; and to provide such an apparatus which can be conveniently regulated for heat-softening articles of various thermoplastic compositions.

Briefly described, the air-tempering device provided by this invention includes a housing having an air intake opening and an air exhaust opening in spaced relation in the top wall thereof. The housing encloses an air intake chamber and an air exhaust chamber which are associated with respective housing openings and which are connected by a restricted passage, the air exhaust chamber and restricted passage preferably being embodied in a casing of insulating material mounted within the housing in spaced relation to the outer side walls of the housing. A fan means disposed within the air intake chamber is adapted for drawing air through the air intake opening and for forcing air through the restricted passage and the exhaust chamber to the exhaust opening, and a heater means, preferably disposed within the restricted passage, is provided for heating air directed through the passage. Means, such as grids mounted over the housing openings, are provided for supporting an article in alignment with the housing openings. In this construction, an article to be heated or heat-softened can be placed upon the support over the exhaust opening to be heated by heated air forced through the opening and can thereafter be held over or disposed upon the air intake opening support or grid to be cooled to ambient temperature by cool air drawn into that opening.

In a preferred embodiment of this invention, the restricted passage and air exhaust chamber are lined with heat-reflecting material and are of a width substantially corresponding to the maximum width of an ophthalmic frame or mounting, the fan means being adapted to force air through the entire width of the restricted passage, and the heater means being disposed over the entire width of the passage for rapidly and uniformly heating air passed therethrough. In this embodiment, the exhaust opening grid is of corresponding width whereby all parts of an ophthalmic frame disposed thereon can be uniformly heated at the same time. Preferably, also, shield means are selectively provided for interposition between selected parts of an ophthalmic mounting and the exhaust grid for permitting heating of less than the entire mounting where desired.

In a practical embodiment of this invention, heat-responsive means are disposed within the exhaust chamber for regulating the heater means to control the temperature of air forced through the exhaust chamber, and preferably baffle means are associated with the restricted passage for deflecting heated air forced into the exhaust chamber so that said air is uniformly mixed within the exhaust chamber, the baffle means being positioned to shield the heat-responsive means from direct radiation from the heater means but being adapted to direct heated air upon the heat-responsive means whereby the heat-responsive means can provide accurate and rapidly responsive regulation of said heating means.

Other objects, advantages and details of construction of the device provided by this invention will appear in the following, more detailed, description which refers to the drawings wherein.

Figure 1:
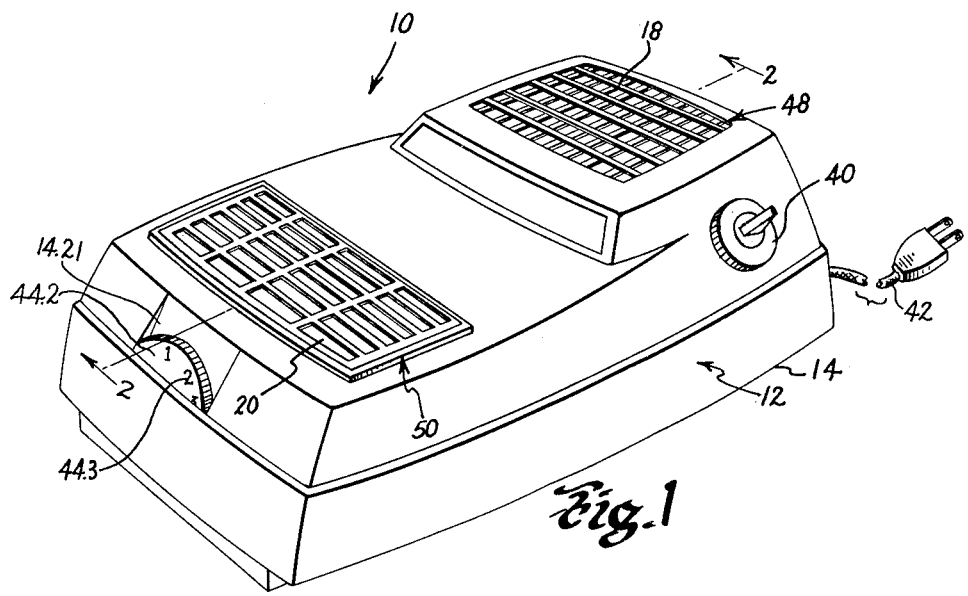
FIG. 1 is a perspective view of the apparatus provided by this invention.

Referring to the drawings, 10 in FIG. 1 indicates the air-tempering device provided by this invention which preferably is of compact size and pleasing configuration suitable for placement upon a table or desk and which is adapted to be operated from a conventional power source such as would be available in any home or office. The air-tempering device, as illustrated, is particularly adapted for use by opticians for heat-softening thermoplastic ophthalmic frames or mountings to provide the frames with lenses to permit shaping of the frame contours to the needs of individuals to be fitted with eyeglasses.

The device includes a housing 12 which comprises a main housing member 14 and a base plate 16, the plate being secured to the main housing member by screws (not shown) in conventional manner. The main housing member has an air intake opening 18 in the top wall thereof adjacent one end of the housing and has an air exhaust opening 20 in the top wall thereof in spaced relation to the intake opening, the housing forming an air intake chamber, as at 22, associated with the intake opening 18. The main housing member is preferably of molded construction, as shown and is formed of any suitable material having low thermal conductivity and having satisfactory characteristics of strength, chip resistance, etc. Preferably, the main housing member has an inner side wall 14.1 and an outer side wall or skirt 14.2 extending entirely around the periphery of the air-tempering device, the inner wall being provided with a plurality of apertures 14.3 for a purpose to be described below. The base plate may be formed of metal such as sheet steel for reasons of strength and can be provided with resilient lifts 16.1 of rubber or similar material for providing ventilation space beneath the device when mounted upon a table and for providing an anti-vibration type of mounting for the device.

An air exhaust chamber 24 is embodied in an exhaust chamber casing 26 which includes a base block 26.1, an end plate 26.2, a cover block 26.3 and side blocks 26.4 and 26.5 respectively. The casing members are preferably formed of compressible fiberglass heat-insulating material and are adapted to be fitted together in any suitable manner so that the members are held together to form the casing by being clamped between the main housing member 14 and the base plate 16. As illustrated, the exhaust chamber 24 is open at an end 24.1, which coincides with the housing exhaust opening 20 and has a restricted passage 28 etxending between the exhaust casing cover and base blocks, 26.3 and 26.1, respectively, to the air intake chamber 22. Most advantageously, the exhaust chamber 24 and the restricted passage 28 are lined with reflective material such as pressure-sensitive reflecting tape or aluminum foil as indicated at 30. Where, as illustrated, the air-tempering device is to be used for heat-softening ophthalmic frames, the housing exhaust opening 20 is of substantially rectangular shape and is of a size adapted to receive an ophthalmic frame of maximum width thereon, as shown by the frame F illustrated in broken lines in FIG. 6, the exhaust chamber 24 and the restricted passage 28 also having a width substantially corresponding to that of the exhaust opening. Preferably the exhaust chamber casing components have a plurality of air passages along the outer side of the components, as at 26.7, to permit air to move entirely around the exhaust chamber casing.

A fan means 32 of conventional design is mounted within the air intake chamber 22 by screws 32.1 threadedly engaged in bosses 32.2 in the main housing member 14 and is adapted to draw air into the intake chamber through the intake opening 18 for increasing air pressure within the intake chamber so that air will be forced through the entire width of the restricted passage 28 and the exhaust chamber 24 to exit through the housing exhaust opening 20. Air also is forced through the exhaust chamber air passages 26.7 to be vented from the apertures in the housing wall as at 14.3. In this manner, the stream of air supplied to the air intake chamber by the fan means 32 is split in leaving the air intake chamber so that a part of the air stream is heated in the passage 28 and so that the remainder of the air stream is passed around the exterior of the exhaust chamber casing to conduct heat away from the outside of the casing, thereby to prevent overheating of the housing 14 in the area of the exhaust chamber casing. In order to provide uniform air flow through all parts of the restricted passage 28, it is preferred that the fan 32 be mounted as shown so that the fan does not deflect air directly into the restricted passage but merely increases intake chamber air pressure which permits release of that pressure by uniform air flow through all parts of the restricted passage 28 and through the cooling ducts or passages 26.7. It will be noted that positioning of the fan means within the air intake chamber in the manner shown draws cooling air over the fan motor throughout the period of fan operation.

A heater means 34 comprising a thin, rigid sheet 36 of heat-resistant material having a resistance-type of heating unit 38 mounted thereon is disposed within the restricted passage 28. The heater mounting sheet 36 is notched to a predetermined depth at either end of the sheet as at 36.1 and the resistance unit 38 is formed of a sequence of series-connected resistance coils 38.1 which extend across the entire width of each side of the mounting sheet. In this construction, the heater means 34 is disposed within the restricted passage 28 so that the notched ends of the mounting sheet 36 are clamped between the cover block and base block, 26.3 and 26.1 respectively, of the exhaust chamber casing and so that the heater coils extend across the entire width of the restricted passage 28, whereby air flowing across the entire passage width can be uniformly heated by the heater means. Of course, the heater means herein disclosed comprise a preferred construction, but it should be understood that other heater means adapted uniformly to heat air passing through the passage 28 are within the scope of the invention.

Figure 2:
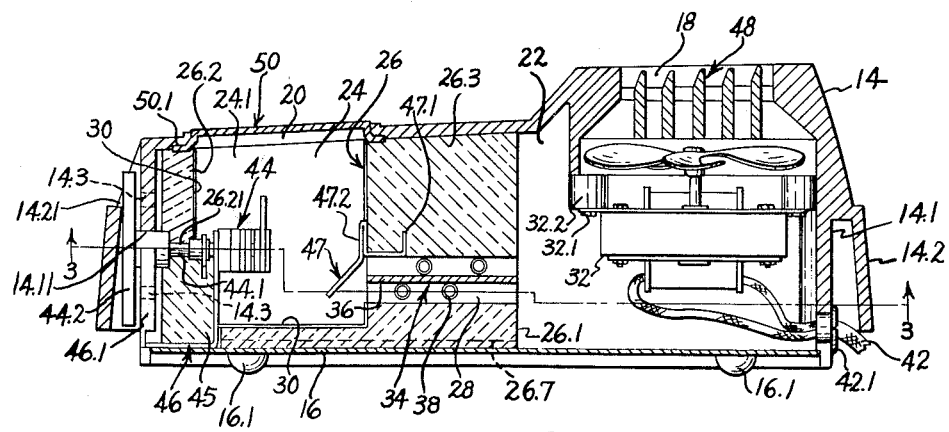
FIG. 2 is a section view along line 2—2 of FIG. 1.
Figure 3:
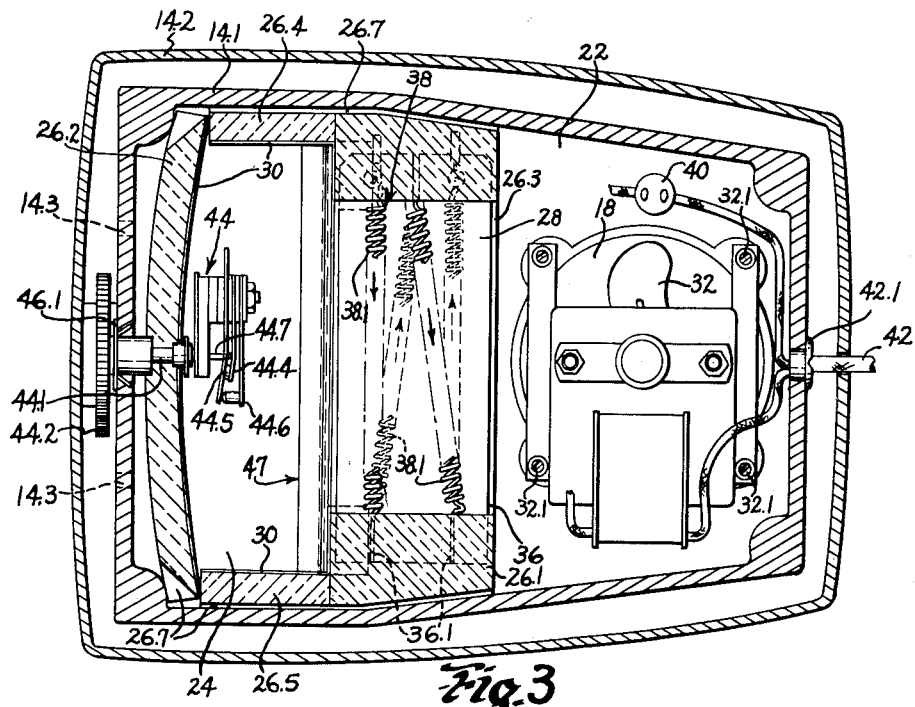
FIG. 3 is a section view along line 3—3 of FIG. 2.
Figure 4:
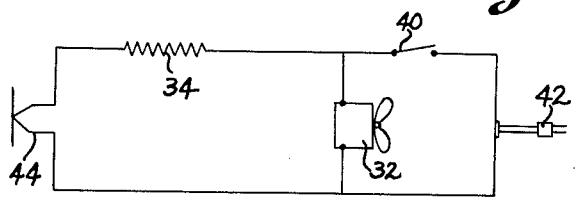
FIG. 4 is a schematic diagram showing the electrical circuits provided for the apparatus of the invention.

As shown in FIG. 4, the fan means 32 and the heater means 34 are connected in parallel and are arranged in series relation to a switch 40 and to a power source indicated by the conventional two-wire plug 42. The plug is preferably adapted to fit a wall receptacle such as might be provided in the power system of any home or office building, and preferably the jack is secured to the main housing member 14 by a rubber grommet 42.1 or other suitable means as shown in FIG. 2. As illustrated, closing of the switch 40, which is mounted upon the main housing member 14, simultaneously energizes the fan and heater means. In addition, a thermostat 44 mounted within the exhaust chamber 24 is interposed in series relation with the heater means 34 and is adapted to interrupt the heater circuit in response to increase in temperature within the exhaust chamber 24. It should be understood that other circuit arrangements providing for fan and heater operation and for regulating heater operation in accordance with exhaust chamber temperature could be utilized within the scope of this invention.

The thermostat 44 disposed within the exhaust chamber 24 is mounted upon an angular frame 46 clipped to the housing member 14 as at 46.1, the thermostat having an adjusting shaft 44.1 extending through a notch 26.21 in the exhaust chamber casing end plate 26.2 and through a slot 14.11 in the inner side wall 14.1 of the main housing member. A spacer member 45 of an insulating material, such as compressible fiberglass, corresponding to the material forming the exhaust chamber casing is fitted within the end plate notch for filling that portion of the notch not occupied by the thermostat shaft and for clamping against the support 46 to secure the thermostat in position. The outer side wall 14.2 of the main housing member is apertured as at 14.21 to receive a portion of the control knob 44.2 attached to the thermostat shaft so that, as shown in FIG. 1, control data 44.3 imprinted on the knob can be seen through the aperture 14.21 for indicating the thermostat setting.

The thermostat is of conventional design having a pair of resiliently mounted contacts 44.4 and 44.5 inherently biased together for normally closing the heater circuit as above described, having a heat-responsive member such as the bimetallic strip 44.6 adapted to flex in response to increase in temperature for moving the contact 44.5 away from the contact 44.4, and having a plunger 44.7, adjustably positioned by rotation of the thermostat shaft, for limiting the extent to which the contact 44.4 can follow movement of the contact 44.5. In this construction, when the thermostat is disposed within the exhaust chamber 24, the plunger 44.7 can be adjusted to a suitable position for limiting movement of the contact 44.4 in response to its inherent bias toward the contact 44.5 so that as the heat-responsive member 44.6 flexes to a sufficient extent in response to sufficient increase in exhaust chamber temperature, resultant movement of the contact 44.5 will separate the contacts for opening the heater circuit. Of course, the thermostat plunger can be adjusted to various positions for regulating the heater means to maintain any desired exhaust chamber temperature. It should be understood that the thermostat means described is of a preferred construction, but that any generally similar heat-responsive means adapted to open a circuit in response to a predetermined temperature is within the scope of this invention.

According to the invention, a baffle 47 having a channel-shaped mounting section 47.1 and a flange or baffle portion 47.2 is embedded in the exhaust chamber casing cover block 26.3 as shown so that the baffle flange is arranged to deflect heated air directed through the passage 28 into the exhaust chamber 24. The baffle is proportioned so that said deflected air is again deflected from the base and walls of the exhaust chamber to acquire a substantially circular motion within the exhaust chamber whereby the heated air will be intimately mixed so that all currents of the air will be of substantially uniform temperature. The baffle is also positioned to shield the thermostat 44 from direct radiation from the heater means 34 but is adapted to assure that air heated in the passage is deflected against the thermostat. In this construction, the thermostat is adapted to respond only to air temperature within the exhaust chamber rather than to radiation from the heater means, but is located for rapidly detecting the heating of air above the desired temperature.

Preferably, means such as the support sections 48 and 50 are mounted within respective air intake and exhaust openings for supporting an article such as an ophthalmic frame in alignment with the openings. The intake support 48 can comprise a grid formed of any suitable material and can be molded integral with the housing member 14 or can be mounted upon the member 14 in any suitable manner. As illustrated, the air intake opening 18 and the intake opening support sections 48 are smaller than the exhaust opening 20 and exhaust opening support sections 50, but the supports and openings could be of the same size sufficient to accommodate an entire ophthalmic mounting or any other desired type of article.

The exhaust opening support 50 preferably comprises a perforated member such as a grid of suitable material such as a thermosetting plastic adapted to receive an article to be heat-softened thereon. Preferably, the grid has a peripheral flange 50.1 which is held within the exhaust opening 20 by clamping of the grid flange between the housing member 14 and the exhaust chamber casing 26.

In utilizing the air-tempering device provided by this invention, the plug 42 can be connected to a suitable power source and the switch 40 can be moved to closed circuit position for actuating the fan 32 and for energizing the heater 34, thereby to draw cool air from the atmosphere through the grid 48, to force the cool air through the restricted passage 28 to be uniformly heated, to thoroughly mix the heated air in the exhaust chamber 24 for assuring uniform temperature of the air, and to force the uniformly heated air through the grid 50 of the exhaust opening support. Air will also be forced from the intake chamber through the channels 26.7 around the exhaust chamber casing and will be vented through the apertures 14.3 in the housing for preventing overheating of the housing in the exhaust chamber section. An article such as an ophthalmic frame can be placed upon the exhaust opening support 50 to be heat-softened to a uniform degree by said heated air. Since the temperature of the air directed upon the article cannot exceed the limit established by the thermostat, the article can be left upon the support for any length of time even after being fully heated without risk of overheating. Thereafter, at the operator's convenience, the heat-softened article can be removed from the support 50 and can be fitted with lenses or otherwise processed. Then the article can be placed upon or held over the intake opening support to be rapidly cooled to ambient temperature by the cool air drawn into the intake opening 18. It can be seen that the device provided by this invention is compact in size, is inexpensive to manufacture and operate, and is convenient to use, and that since the outer skirt or wall of the main housing is spaced from the heated portions of the device, such as the exhaust chamber casing, and since the outer side of the exhaust chamber casing is cooled by means of air passed through the passages 26.7, the device can be moved between various positions on a table or other support without risk of burning the operator of the device.

Figure 6:
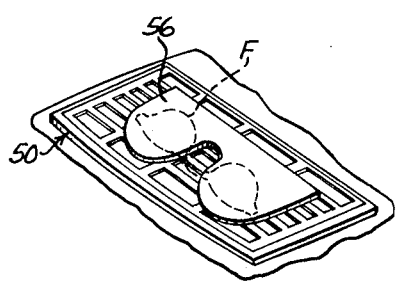
FIG. 6 is a partial plan view in perspective of the device of FIG. 1 showing use of the shield of FIG. 5.
Figure 5:
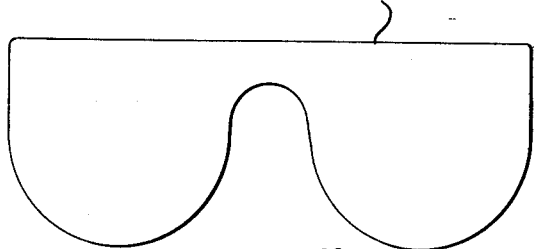
FIG. 5 is a plan view of the shield provided by the invention.

As shown in FIGS. 5 and 6 a shield 56 of a material such as asbestos or other heat-insulating material having low thermal conductivity can be selectively provided with the device 10 for heating less than an entire article therewith, the shield being of an outline corresponding to but greater in size than that of an ophthalmic frame for example. As shown in FIG. 6, the shield can be interposed between the exhaust opening support 50 and an article such as the frame F placed upon the support so that desired parts of the article are shielded from the effects of heated air forced through the exhaust opening 20, while other parts of the article such as the frame bridge are conveniently heated.

It should be understood that although particular embodiments of this device have been described for the purposes of illustration, this invention includes all modifications and equivalents thereof which fall within the scope of the appended claims.

Having described our invention, we claim:

1. An air-tempering device for temporarily heating thermoplastic ophthalmic mountings, said device comprising: a housing having an air intake chamber and an air exhaust chamber in spaced relation therein, said chambers having a restricted passage therebetween, said housing having an air intake opening and an air exhaust opening in relatively widely spaced relation leading from respective chambers through the top wall of the housing, said intake opening and exhaust opening and said chambers and restricted passage being of a width substantially corresponding to the maximum width of an ophthalmic mounting; grid means disposed at each of said openings for supporting an ophthalmic mounting in alignment therewith; fan means for drawing a substantial quantity of air through the intake opening and for forcing substantially all of said air through the entire width of the restricted passage and exhaust chamber to the exhaust opening; and heater means disposed across the major width of said restricted passage for heating air passed therethrough; whereby an entire ophthalmic mounting can be supported on said grid means at the exhaust opening for heating all parts thereof simultaneously and can thereafter be supported on said grid means at the intake opening for uniformly cooling the mounting.

2. An air-tempering device for temporarily heating thermoplastic ophthalmic mountings, said device comprising: a housing part of which constitutes an air intake chamber, said housing having an air intake opening associated with said chamber and an air exhaust opening in spaced relation thereto, the openings being in the top wall of the housing; an exhaust chamber and a restricted passage leading into the exhaust chamber embodied in a casing of a material having low thermal conductivity and lined with heat-reflective material, said casing being mounted within the housing in spaced relation to the outer side walls of the housing with the passage extending into said air intake chamber and with said exhaust chamber fitted against said exhaust opening, said exhaust chamber and opening and said passage being of a width substantially corresponding to the maximum width of an ophthalmic mounting; air passages leading from said air intake channel along the exterior of said casing and opening outside said housing; grid means fitted at each of said housing openings for receiving an ophthalmic mounting thereon; fan means for drawing air through the intake opening and for forcing air through the major width of said restricted passage and exhaust chamber to the exhaust opening; and for forcing air through said air passages to be vented outside said housing, thereby to cool the exterior of said casing; heater means disposed across the major width of said restricted passage for uniformly heating air passed therethrough; heat-responsive means disposed within the exhaust chamber for regulating said heater means to control the temperature of air forced through said exhaust opening; and baffle means associated with said restricted passage for deflecting heated air forced into the exhaust chamber so that said air is substantially uniformly mixed within the exhaust chamber, said baffle means being positioned for shielding the heat-responsive means from direct radiation from said heater means and for directing said heated air upon the heat-responsive means.

3. An air-tempering device for temporarily heating an article, said device comprising: a housing having an air intake chamber and an air exhaust chamber in spaced relation therein, said chambers having a restricted passage therebetween, said housing having an air intake opening and an air exhaust opening extending from respective chambers through the top wall of the housing; means for supporting said article over each of the housing openings; fan means for drawing air through the intake opening and for forcing air through the restricted passage and the exhaust chamber to the exhaust opening; means heating air passing through said restricted passage; heat-responsive means disposed within the exhaust chamber to regulate said air-heating means for controlling the temperature of air forced through the exhaust opening; and baffle means associated with said restricted passage for deflecting heated air forced into the exhaust chamber so that said air is uniformly mixed within the exhaust chamber, said baffle means being positioned for shielding the heat-responsive means from direct radiation from said air-heating means and for deflecting said heated air upon the heat-responsive means; whereby said heat-responsive means can provide accurate and rapidly responsive regulation of said air-heating means, whereby an article can be supported at the exhaust opening to be heated by heated air forced through the exhaust opening, and whereby the article can be thereafter supported at the intake opening to be cooled to ambient temperature by air drawn into the intake chamber.

References Cited in the file of this patent
UNITED STATES PATENTS

| | | |
|---|---|---|
| 2,789,200 | Ebert | Apr. 16, 1957 |
| 2,839,657 | Mast | June 17, 1958 |

FOREIGN PATENTS

| | | |
|---|---|---|
| 1,098,065 | France | July 18, 1955 |